(12) United States Patent
Lutz et al.

(10) Patent No.: US 6,318,524 B1
(45) Date of Patent: Nov. 20, 2001

(54) PISTON CYLINDER UNIT WITH A MOVEMENT DETERMINATION DEVICE

(75) Inventors: Dieter Lutz, Schweinfurt; Achim Thomä, Bergrheinfeld, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/231,026

(22) Filed: Jan. 14, 1999

(30) Foreign Application Priority Data

Jan. 14, 1998 (DE) .............................. 198 01 054

(51) Int. Cl.⁷ ...................................... F16F 9/48
(52) U.S. Cl. .................... 188/284; 92/5 R; 91/1
(58) Field of Search .................. 91/1, 5 R, 5 L; 188/284, 285; 342/118–146; 73/290 V

(56) References Cited

U.S. PATENT DOCUMENTS

| | | | |
|---|---|---|---|
| 4,543,649 | * | 9/1985 | Head et al. .............................. 92/5 R |
| 4,817,922 | * | 4/1989 | Hovance ............................ 267/64.21 |
| 4,936,143 | * | 6/1990 | Schutten et al. ........................ 92/5 R |
| 4,995,635 | * | 2/1991 | Guy ........................................ 188/280 |
| 5,000,478 | * | 3/1991 | Kerastas ................................ 188/285 |
| 5,070,730 | * | 12/1991 | Edvardsson ........................ 73/290 V |
| 5,104,144 | * | 4/1992 | Bethell ................................. 188/284 |
| 5,150,060 | * | 9/1992 | Bitar ........................................... 91/1 |
| 5,780,743 | * | 7/1998 | Morgan .................................. 92/5 R |
| 5,901,633 | * | 5/1999 | Chan ....................................... 92/5 R |
| 5,977,778 | * | 11/1999 | Chan et al. ............................. 92/5 R |
| 6,005,395 | * | 12/1999 | Chan et al. ............................. 92/5 R |

FOREIGN PATENT DOCUMENTS

| | | | |
|---|---|---|---|
| 87 02 817 | 2/1987 | (DE) | .............................. B60G/17/00 |
| 40 41 407 | 7/1997 | (DE) | .............................. B60G/17/01 |
| 36 20 957 | 1/1987 | (DE) | .............................. B60G/17/04 |
| 195 25 775 | 1/1998 | (DE) | .............................. B62D/15/02 |
| 90 12 280 | 7/1990 | (DE) | .............................. F15B/15/28 |
| 94 17 204 | 10/1994 | (DE) | .............................. F15B/15/28 |

\* cited by examiner

Primary Examiner—Robert J. Oberleitner
Assistant Examiner—Robert A. Siconolfi
(74) Attorney, Agent, or Firm—Cohen, Pontani, Lieberman & Pavane

(57) ABSTRACT

A piston-cylinder unit includes a cylinder with a piston rod guide and a piston rod with a piston axially movably mounted in the cylinder so that the piston rod runs through a hole in the piston rod guide. A movement determination device comprising a transmitter portion and a receiver portion determine the movement of the piston from the travel time of waves generated by the transmitter portion. The movement determination device is arranged inside the piston rod guide, and waves reflected by the piston-piston rod component group are analyzed to determine the movement of this component group.

10 Claims, 2 Drawing Sheets

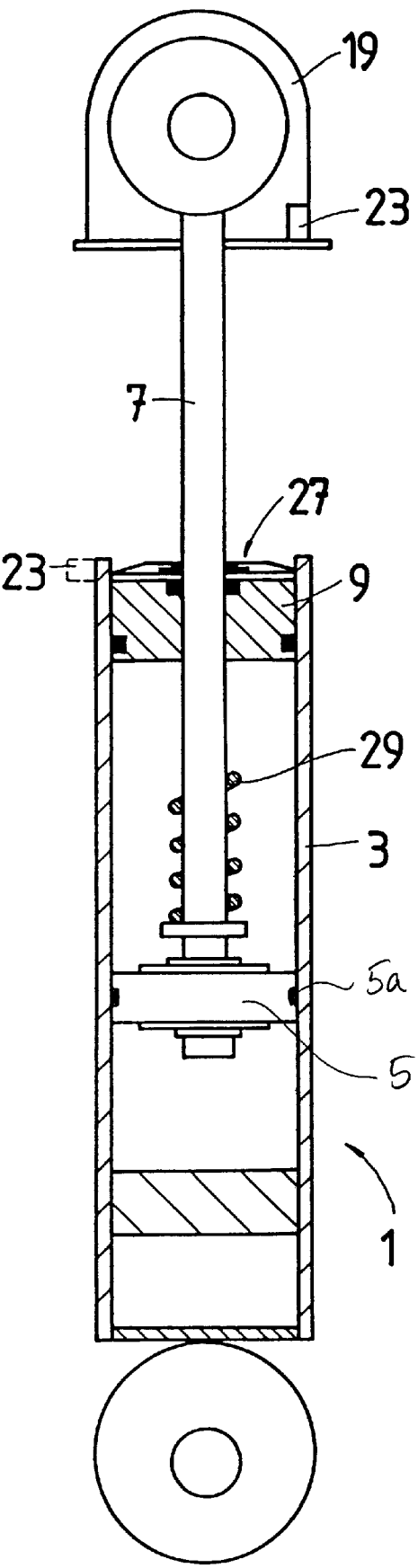

PISTON CYLINDER UNIT WITH A MOVEMENT DETERMINATION DEVICE

BACKGROUND OF THE INVENTION

1. Field of the Invention

The invention relates to a movement determination device for determining movement between two movable parts in a piston-cylinder unit.

2. Description of the Related Art

German reference DE 40 41 407 C2 describes a device for detecting the relative speeds of a piston and cylinder of a vibration damper. The device discloses a sound generator and a sound pickup arranged in the working space of the cylinder remote from the piston rod of the vibration damper. The bottom of the cylinder, specifically the bottom valve, serves as the reflection surface for reflecting the transmitted sound. Although this device is purported to be suitable for so-called single-tube vibration dampers, this assertion is difficult to confirm because single-tube vibration dampers have a separating piston that separates a compensation space from the working space remote from the piston rod. This compensation space—and thus the separating piston—must compensate for the volume of the in-and-out moving piston rod. The separating piston is movable in the axial direction of the vibration damper and therefore cannot be used as a reference mark. Furthermore, the separating piston is completely reflective, so that the cylinder bottom can supply no reflections or only too few reflections.

Another prior art device is disclosed in German reference DE 40 41 407 C2 in which a transmitter is located at the end of the piston rod. In this device, it is absolutely necessary to employ a hollow piston rod, so that the connection cable can be run to the sound generator and pickup. This creates additional design problems, because the piston rod must be hydraulically tight at its end. In addition, the contacts are also easy to assemble.

Yet another prior art device is disclosed by German reference DE 36 20 957 A1, which describes a suspension system with a fluid compression spring strut having a hollow housing supported by two end elements that are movable toward or away from each other in the axial direction of the spring. A device is provided on one end element to measure the axial distance between the end elements by the transmission of ultrasound pulses in the axial direction. The pulses are sent back by the other end element, for example, so as to measure the travel time of the pulses in the housing and thus determine the distance between the two end parts inside the housing at any time. Preferably, a transmitter-receiver is arranged on one end element and a reflector is arranged on the other end element, while a stationary reflector attached to the end element carrying the transmitter-receiver provides a reference value.

The ultrasound waves are propagated in the cushion of the spring. The gas inside the spring has practically no damping effect on the vibrating body, so that many signals are reflected from the surfaces in the spring, and the signal that represents the correct distance between the two end elements must be filtered out.

For physical reasons, this type of ultrasound transmission and reception in a gaseous environment is only able to correctly measure distances of at least 0.3 m between the end elements. Shorter distances can be detected only by separately operating transmitter and receiver parts. However, these entail considerable apparatus-related expense.

SUMMARY OF THE INVENTION

The object of the present invention is to provide a measurement device for a piston-cylinder unit which overcomes the problems known from the prior art.

The object of the invention is attained in one embodiment by arranging the transmitter and receiver inside the piston rod guide. In this embodiment, a wave reflected by the piston-piston rod component group is analyzed to determine the movement of this component group. The piston rod guide is an advantageous location for the transmitter and the receiver because no modifications to the piston rod are required and also because the accessibility for electrical connections is not problematic. Furthermore, any damping effect of a fluid in the working space may be used, firstly, to obtain the clearest possible reflection signal and, secondly, to employ higher frequencies, so that a more precise measurement of the movement of the piston rod-piston component may be effected.

To create the preconditions for the most precise reflection signal possible, the piston rod guide includes a focusing channel that bundles the waves emitted by the transmitter. To the extent allowed by the axial and radial extensions of the piston rod guide, the focussing channel is designed with a funnel-shape to enhance the bundling effect.

A basic problem in analyzing the reflection is that the reflection body must be attached in stationary fashion to the body in question. Therefore, the piston-piston rod component has a reflection body that is independent of the movable parts on the piston. The movable parts could include valve disks or an axially movable piston ring, for example. Experience shows that the movement of these parts is very slight. Nonetheless, in some circumstances, the desired measurement precision is so high that these possible movements have an effect on the measurement result.

In an alternative embodiment for a piston-cylinder unit according to the invention which includes a first part including a cylinder with a piston rod guide and a second part including a piston rod with a piston run in an axially movable fashion inside the piston rod guide. A movement determination device including a transmitter in one of the first and second parts and a receiver in the other of the first and second parts for determining the movement of the first and second parts relative to each other from the travel time of waves generated by the transmitter which transmits sound waves along the surface of the one of the first and second parts associated with the transmitter. The sound waves are reflected by the other of the first and second parts. The advantage of this variant of the invention is that the vibration frequency in the solid body parts of the piston-cylinder unit are very high, which benefits measurement accuracy. This advantage is particularly significant in the case of units that have no fluid filling.

In a further embodiment, the transmitter is mounted in an especially protected position, for example, when the piston-cylinder unit is used in a motor vehicle. The transmitter is attached to a section of the piston rod that remains outside the cylinder even during the maximum inward travel of the piston rod. The front face of the cylinder thereby forms a reflection surface in the area of the piston rod guide. A further advantage is that the cylinder and the piston rod guide need no access opening for the transmitter and receiver or for a combined transmitter-receiver. A sealing point is thus unnecessary. The area on or in the attachment element of the piston rod can serve as an especially protected location for the receiver.

The transmitter, as desired, can be a shear converter or a transversal converter in connection with a wedged or tapered seating.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 shows a piston-cylinder unit according to another embodiment of the present invention with measurement device using surface wave propagation.

DETAILED DESCRIPTION OF THE PRESENTLY PREFERRED EMBODIMENTS

Figure 1:
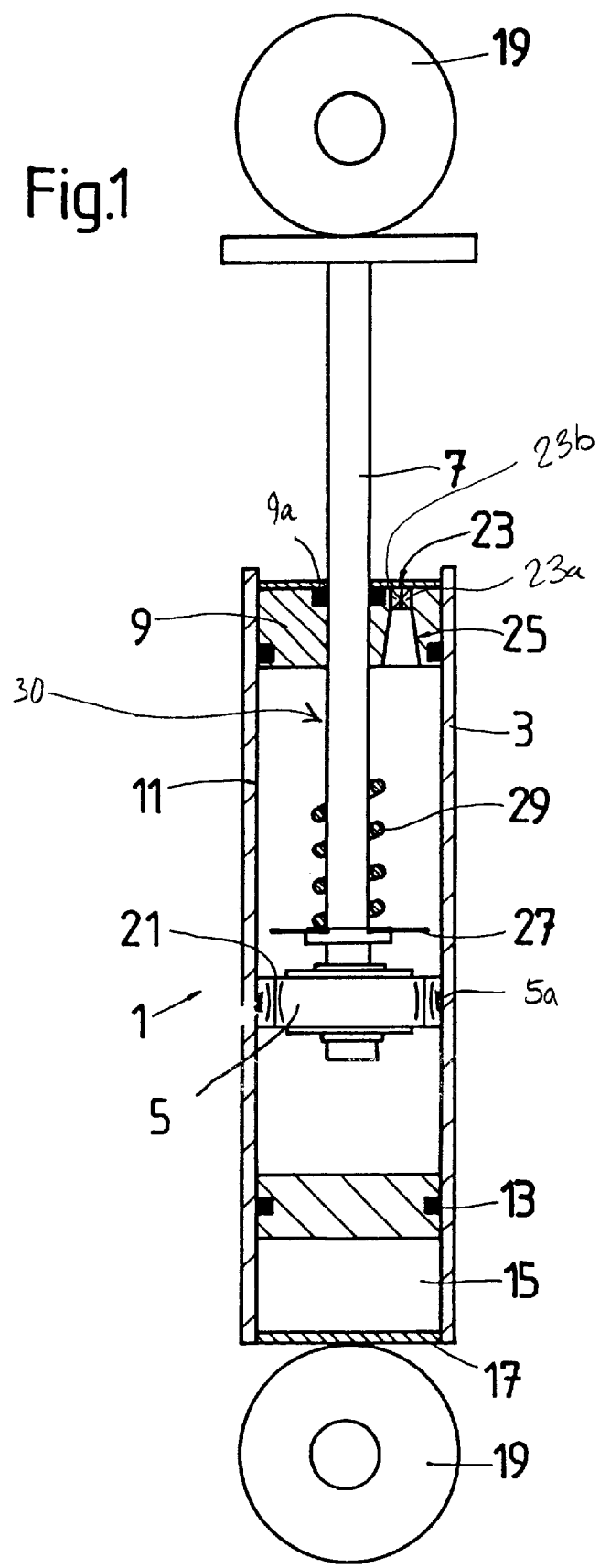
FIG. 1 shows a piston-cylinder unit according to an embodiment of the presetn invention with measurement device positioned inside a piston rod guide.

FIG. 1 shows, for example, a piston-cylinder unit 1 in the embodiment of a one-tube vibration damper. However, the invention may also be used, in principle, in other applications.

The piston-cylinder unit 1 includes a cylinder 3 in which a piston 5 connected to a piston rod 7 is arranged in an axially movable fashion. The ends of the cylinder 3 are closed by a piston rod guide 9 at one end through which the piston rod 7 exits the cylinder 3 and a bottom 17 at the other end connected to an eye 19. The piston rod guide 9 closes a working space 11 of the cylinder 3 filled with damping medium and separated by a separating piston 13 from a gas space 15, which is closed by the bottom 17.

Upon movement of the piston rod 7, the damping medium in working space 11 is forced through damping valves 21 in the piston 5. A piston ring (not shown) prevents the damping medium from flowing laterally around the piston 5.

A movement determination device 23 is arranged Inside the piston rod guide 9. The movement determination device 23 includes a transmitting portion 23a and a receiving portion 23b. The movement determination device 23 may comprise one or more piezoelements, each of which can perform the function of the transmitting portion and the receiving portion in alternating operation.

The movement determination device 23 is located at the closed end of a focussing channel 25 in the piston rod guide 9. This focusing channel 25 bundles the transmitted waves, so as to minimize the quantity of reflected waves.

A reflection body 27 is attached to the piston-piston rod component group 30 which includes the piston 5 and the piston rod 7. The reflection body 27 has a defined position on the component group 30, independent of the moving parts of the piston, e.g., valve disks or piston rings. The embodiment of FIG. 1 shows a tension stop spring 29, the length of which upon installation is known and which can he used as a reference variable relative to the reflection body 27 to compensate for temperature-related fluctuations during wave transmission in the fluid of the working space 11. The advantage of the tension stop spring 29 is that the spring provides a reflection pattern that can be found from one measurement with greater reliability than a single measurement peak as a reference variable. A fluid thereby acts in a signal-damping fashion in the positive sense.

Sound waves are transmitted during operation of the movement determination device 23. The travel time of the transmitted sound waves or of the reflections of the transmitted sound waves is a measure of the distance between the sound source and the reflection body, because the sound propagation speeds within various media are known. If the distance is known, the speed or acceleration or the change in acceleration can be found by chronological derivation. The piston rod guide 9 with its piston rod seal 9a, which provides a clear signal, is especially suitable as a reference point for the measurement. Further, it has been found that the piston seal 5a of the piston 5 may also be used is a second reference signal, so that, in some cases, the reflection body 27 is not required.

FIG. 1 shows an embodiment in which the movement determination device 23 in internal to the cylinder 3. However, the invention also relates to possible embodiments in which the transmitter is located outside the cylinder 3.

In an alternative embodiment of the invention shown in FIG. 2, the movement determination device 23 is attached to the piston-cylinder unit 1. In this embodiment, the movement determination device 23 generates surface sound waves, which run, for example, along the outer cylindrical surface of the piston rod 7. The movement determination device 23 is attached to the piston rod 7 in an area that remains outside of the cylinder 3 even during maximum inward travel. The front face of the cylinder 3 or of the piston rod guide 9 forms the reflection surface. As required, a separate reflection disk 27 may also be attached at this location.

In this embodiment, the movement determination device 23 is associated with the attachment element 19. In a motor vehicle, the piston-rod-side attachment element is usually inside the chassis, and the necessary supply cables are thus well protected. Furthermore, the frequency of the vertical movements in a motor vehicle body is less by a power of ten than the frequency of movements of an associated vehicle wheel so that this location for the movement determination device 23 is accompanied, overall, by lesser loads. Of course, the surface wave method may also be used with the embodiment of FIG. 1 in which the movement determination device 23 is mounted in the piston rod guide 9 to allow the sound waves to move along the internal diameter of the cylinder 3.

Moreover, the movement determination device 23 may optionally be attached externally to the cylinder 3 so that the surface waves radiate on the external diameter of the cylinder 3 (see movement determination device 23 shown in broken lines in FIG. 2). The attachment location is determined basically by space conditions. In this optional embodiment, the waves reflect off of the piston seal 5a.

The movement determination device 23 may, for example, comprise a shear converter, whose wave propagation is oriented at a slight angle to the longitudinal axis of the piston-cylinder unit 1. The wave motion takes place, with a destination-directed orientation of the transmitter, along the surface, whereby damping occurs due to the metal material of the piston rod 7, enabling the transmitter and the receiver to comprise a single part in alternating operation. A shear converter comprises at least two cuboid-shaped vibration elements that rest flatly on each other. The two or more vibration elements move toward each other in the area of their contact surfaces, whereby their orientation coincides substantially with the axial direction of the piston rod.

Alternatively, the movement determination device 23 may also comprise a transversal converter used in conjunction with a wedge-shaped connection point to the part to be placed into vibration. In this device, the sound waves are generated in the stack direction of the vibration elements and are deflected toward the surface via the wedge-shaped connection point.

The invention is not limited by the embodiments described above which are presented as examples only but can he modified in various ways within the scope of protection defined by the appended patent claims.

We claim:

1. A piston-cylinder unit, comprising:

a cylinder having a first end and a second end;

a piston rod guide mounted at said first end of said cylinder;

a piston-piston rod component group including a piston connected to a piston rod axially movably mounted in said cylinder so that said piston rod extends through an opening in said piston rod guide;

a movement determination device having a transmitter portion and a receiver portion operatively mounted in said piston rod guide for emitting waves from said transmitter portion and analyzing a travel time of reflections of said waves at said receiver portion for determining a movement of said component group relative to said cylinder; and a stop spring operatively connected to said piston rod for limiting movement of said piston rod, said stop spring being operatively arranged for effecting a reflection pattern during measurement wave propagation recognizable as a reference variable for the temperature compensation of the measurement device.

2. The piston-cylinder unit of claim 1, wherein said piston rod guide comprises a focusing channel for bundling said waves emitted by said transmitter portion of said movement determination device.

3. The piston-cylinder unit of claim 1, wherein said component group further comprises a reflection body which is embodied independently of said piston.

4. The piston-cylinder unit of claim 1, wherein said transmitter comprises a shear converter.

5. The piston-cylinder unit of claim 1, wherein said transmitter comprises a transversal converter in connection with a wedge seating.

6. A piston-cylinder unit, comprising:

a cylinder having a first end and a second end;

a piston rod guide mounted at said first end of said cylinder;

a piston-piston rod component group including a piston connected to a piston rod axially movably mounted in said cylinder so that said piston rod extends through an opening in said piston rod guide;

a movement determination device having a transmitter portion and a receiver portion operatively mounted on one of the component group and the cylinder for transmitting waves that run along the surface of the one of the component group and the cylinder and analyzing a travel time of reflections of said waves at said receiver portion for determining a movement of said component group relative to said cylinder; and a stop spring operatively connected to said piston rod for limiting movement of said piston rod, said stop spring being operatively arranged for effecting a reflection pattern during measurement wave propagation recognizable as a reference variable for the temperature compensation of the measurement device.

7. The piston-cylinder unit of claim 6, wherein said transmitter portion is connected to a position on said piston rod that remains outside of said cylinder during a maximum inward travel of said piston rods wherein a front face of said cylinder at said first end of said cylinder forms a reflection surface in the area of said piston rod guide.

8. The piston-cylinder unit of claim 7, wherein said transmitter is arranged on an attachment element of said piston rod.

9. The piston-cylinder unit of claim 7, wherein said transmitter comprises a shear converter.

10. The piston-cylinder unit of claim 6, wherein said transmitter comprises a transversal converter in connection with a wedge seating.

* * * * *